Feb. 2, 1926.
O. R. LUDWIG
FOLDING CARRIER
Filed June 15, 1925
1,571,850
2 Sheets-Sheet 1
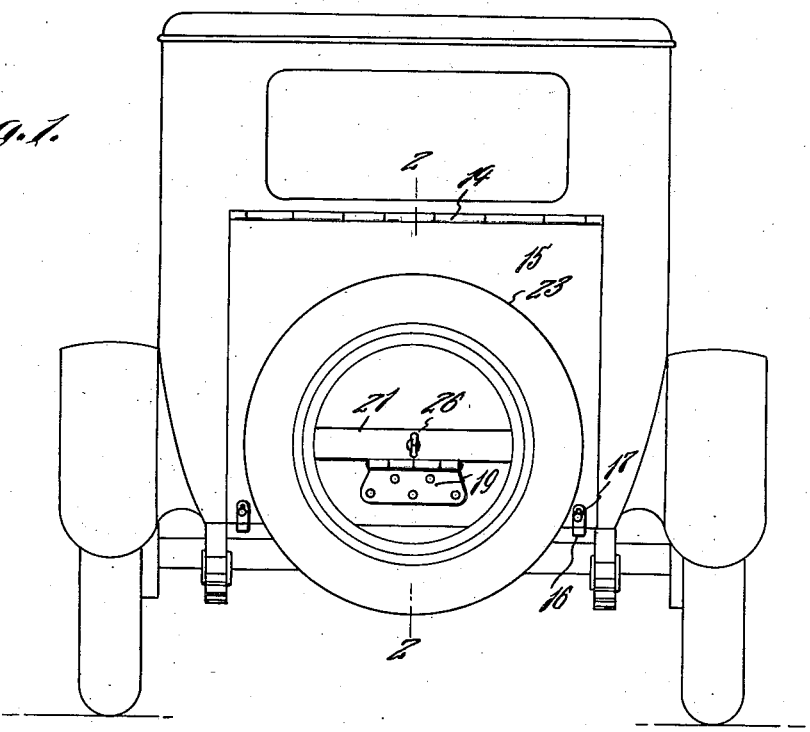
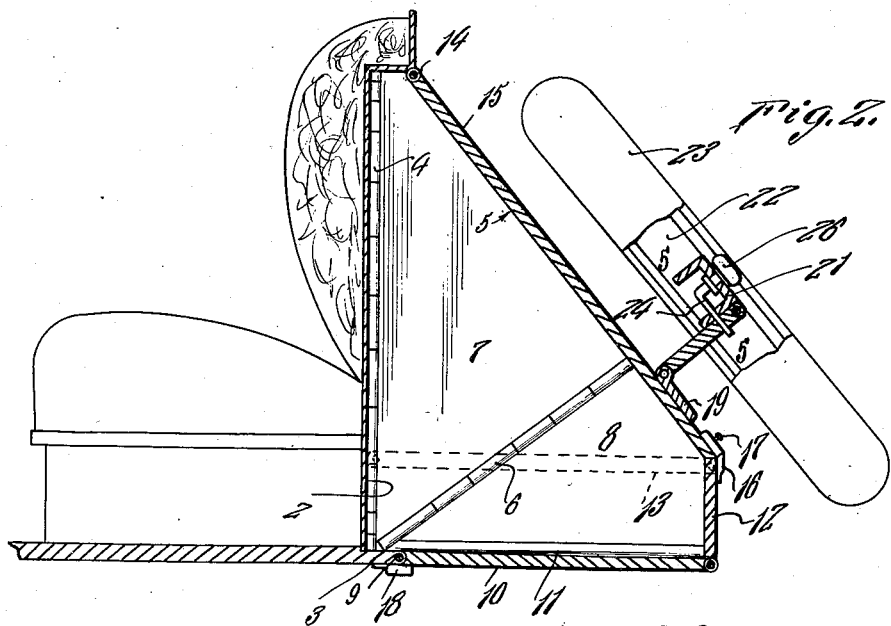
O. R. Ludwig, INVENTOR
BY Victor J. Evans, ATTORNEY Feb. 2, 1926.
O. R. LUDWIG
1,571,850
FOLDING CARRIER
Filed June 15, 1925   2 Sheets-Sheet 2
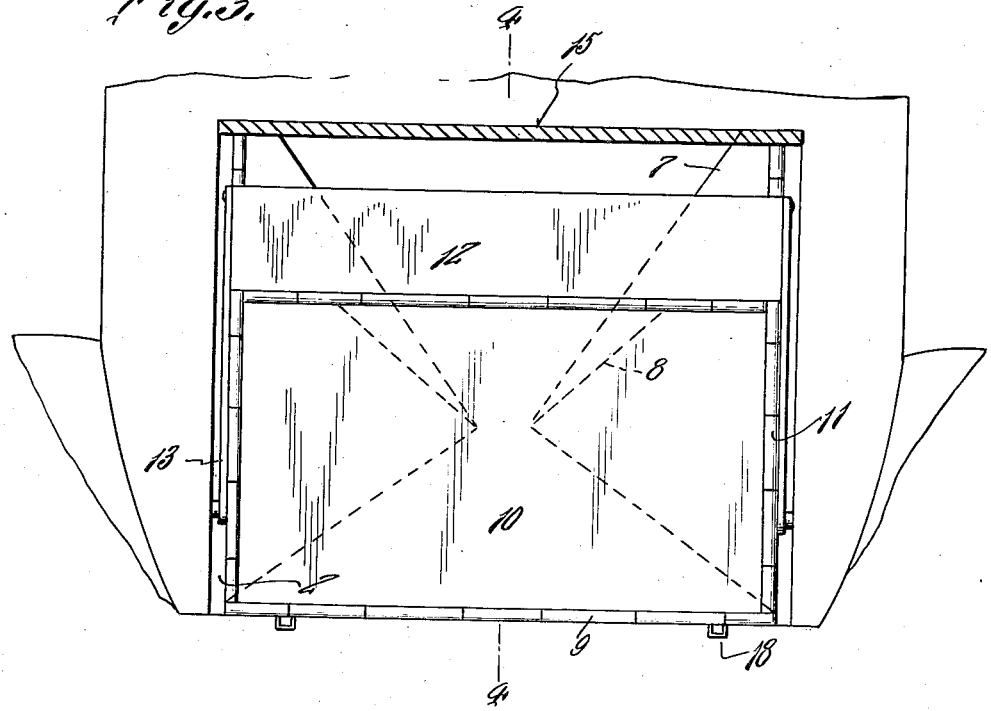
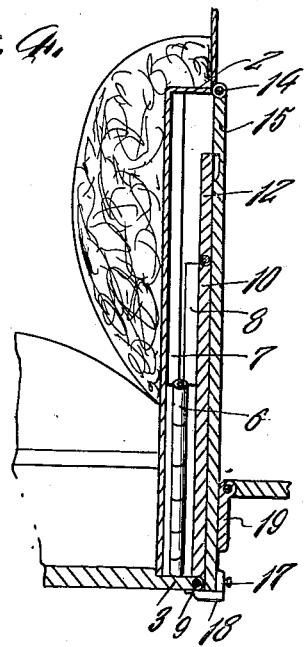
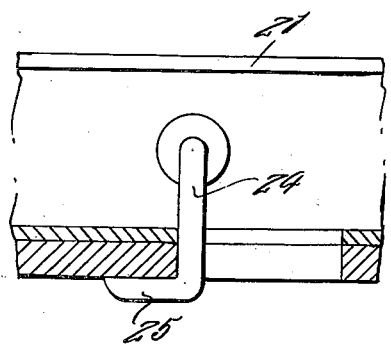
O. R. Ludwig
INVENTOR
BY Victor J. Evans
ATTORNEY Patented Feb. 2, 1926.

1,571,850

UNITED STATES PATENT OFFICE.

OTTO R. LUDWIG, OF GARVIN, MINNESOTA.

FOLDING CARRIER.

Application filed June 15, 1925. Serial No. 37,372.

*To all whom it may concern:*

Be it known that I, OTTO R. LUDWIG, a citizen of the United States, residing at Garvin, in the county of Lyon and State of Minnesota, have invented new and useful Improvements in Folding Carriers, of which the following is a specification.

The object of this invention is the provision of a folding carrier for automobiles or like vehicles.

A further object is the provision of a carrier for vehicles which may be formed therewith in the construction of the vehicle or which may be attached thereto, the said carrier when in folded position, having the elements constituting the same resting against each other and snugly against the back of the vehicle and effectively locked thereon, and when in operative position provide a compartment which is closed by a door, and wherein the construction is such as to rigidly support the carrier in both its open or closed position.

A still further object is the provision of a device of this character that shall provide a support for a spare wheel or tire, the said wheel or tire being mounted thereon in a manner to permit free access to the gasoline supply tank when the carrier is either in its set up or closed position.

The improvement further consists in certain features of construction, combination and operative association of parts, a satisfactory exemplification of which being disclosed by the accompanying drawings, set forth in the description and pointed out with particularity in the appended claims.

In the drawings:—

Figure 1 is a view looking toward the rear of a vehicle provided with the improvement.

Figure 2 is a sectional view approximately on the line 2—2 of Figure 1, but showing the improvement in set up or operative position.

Figure 3 is an enlarged rear elevation, with parts in section, of the improvement when in closed or collapsed position.

Figure 4 is a sectional view on the line 4—4 of Figure 3.

Figure 5 is a detail sectional view on the line 5—5 of Figure 2.

Although in the drawings I have illustrated the rear of a vehicle A provided with a substantially rectangular pocket for the reception of my improvement, when in folded or collapsed position, it is to be understood that my device may be successfully arranged on the back of vehicles not provided with such pockets. Therefore, I will refer to the inner wall 1 of the pocket as the back of the improvement. The back is provided on its upper and lower edges with outstanding flanges 2 and 3, respectively. In the showing of the drawing, the flange 3 provides the rear portion of the bottom of the vehicle.

Secured by hinged joints 4 to the edges of the back 1, there are the side members of the improvement. The inner and lower edges of the sides are disposed at right angles to each other, but the outer edge of the said sides are cut angularly from points adjacent to the inner and outer corners thereof. The angle edges of the sides are indicated for distinction by the numeral 5. Each side is constructed of two parts, the meeting edges of the same being cut diagonally, and these meeting edges are connected by a hinge 6. Thus each of the sides provides two members 7 and 8, respectively. The members 7 and 8 are in the nature of wings and the wing 7 may be folded upon the hinged joint 4 inwardly against the back 1, while the wings 8 may be folded on their hinged connections 6 against the wings 7. In this manner it will be noted that the side members may be snugly folded against the back 1 and be received between the upper and lower flanges of the said back.

Hingedly secured, as at 9, to the outer edge of the flange 3, there is the bottom board 10 of the improvement. This board in turn is hinged, as at 11, to the wings 8. When the wings 7 and 8 are folded as above described, the bottom 10 may be likewise folded against the wings 8. Hingedly secured to the outer edge of the bottom 10 there is what I will term the front board 12 of the improvement. The front board 12 has pivotally secured to the outer edges thereof links 13, the said links having their free ends pivotally secured to the back 1. The links are in the nature of brace members and prevent the outward swinging of the front board 12.

Hingedly secured to the upper flange 2, as at 14, there is what I will term the cover board 15 of the improvement. The cover when the device is in set up position, swings over the outer beveled edges 5 of the sides and has its outer edge contacting with the upper edge of the front board 12. The front board 12 carries keepers 16 to be engaged by spring influenced latches 17 on the cover 15. When the front is swung to upright position, in parallelism with the bottom 10, when the device is folded, the cover may be swung over both the front board and the bottom 10 and the latches 17 will then engage with keepers 18 on the flange 3. When so arranged it will be noted that the improvement is compactly folded and provides only a small projection on the back of the vehicle A. When the improvement is let in a pocket in the back of the vehicle none of the parts of the improvement project through said pocket and the cover board 13 being arranged flush with the said back of the vehicle.

Fixedly secured to the cover 15 there is one leaf of a hinge 19. The outer leaf of the hinge has attached thereto a channel member 21 that forms one element of a holder 22 for a spare tire 23. Swingably associated with the channel member 21 there is an angle latch member 24. The member 24 has its finger movable through elongated slots in the flange of the channel member attached to the outer leaf of the spring. The finger of the latch has its ends offset, as at 25, for contacting engagement with the said outer leaf of the hinge 19. The latch member has an operating head 26. By turning the head to revolve the latch member the hook 25 will be brought out of engagement with the hinge 19 so that the tire 23 may be swung on its support at an upward and outward angle. By this arrangement access may be obtained to the gasoline tank at the rear of the machine without necessitating the removal of the spare tire 23.

Also the weight of the spare tire and its support has a tendency to hold the cover 15 in closed position when the device is in set up or collapsed position.

My improvement it will be noted, is of a simple construction and may be easily attached to any class of vehicles. By providing the carrier with a cover 15 the articles arranged therein will be protected from weather conditions. The improvement, is of course, susceptible to such changes and modifications as fairly fall within the scope of what I claim without departing from the spirit or sacrificing any of the advantages of the invention.

Having described the invention, I claim:—

1. In a device for the purpose set forth, a back member having upper and lower outstanding flanges, sides having their inner and lower edges disposed at right angles with respect to each other and having their inner edges hingedly secured to the back, said sides having their outer edges cut angularly from points adjacent to the top and to the front thereof, each of said sides comprising two members having diagonal meeting edges which are hingedly connected, a bottom hingedly secured to the lower flange of the back and hingedly secured to the lower and upper sections of the sides, a front hingedly secured to the upper edge of the bottom, swingable brace means between the front and the back and a cover board hingedly secured to the upper flange of the back.

2. A collapsible carrier designed to be attached to the rear of a vehicle and to be let in a pocket in said vehicle, said carrier comprising a back having upper and lower outstanding flanges, sides having their inner edges hingedly secured to the back, said sides having their outer edges cut angularly from the top to the front thereof, each of said sides comprising two sections having diagonal meeting edges which are hingedly connected, a bottom hingedly secured to the lower flange of the back and hingedly secured to the lower edge of the outer side sections, a front hingedly secured to the outer edge of the bottom, supporting links between the front and the back, a cover hingedly secured to the upper flange of the back, latches on the outer edge of the cover, keepers on the front for engagement with the latches when the device is in set up condition and keepers in the lower flange of the back also engageable with said latches when the device is collapsed and folded between the flanges of the back.

In testimony whereof I affix my signature.

OTTO R. LUDWIG.